United States Patent
Nakamura et al.

(10) Patent No.: US 11,371,837 B2
(45) Date of Patent: Jun. 28, 2022

(54) PROJECTION IMAGING SYSTEM, MEASUREMENT DEVICE, AND PROJECTION IMAGING METHOD

(71) Applicant: PANASONIC INTELLECTUAL PROPERTY MANAGEMENT CO., LTD., Osaka (JP)

(72) Inventors: Hideyuki Nakamura, Fukuoka (JP); Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 16/629,483

(22) PCT Filed: Jun. 11, 2018

(86) PCT No.: PCT/JP2018/022140
§ 371 (c)(1),
(2) Date: Jan. 8, 2020

(87) PCT Pub. No.: WO2019/012884
PCT Pub. Date: Jan. 17, 2019

(65) Prior Publication Data
US 2021/0131799 A1    May 6, 2021

(30) Foreign Application Priority Data
Jul. 12, 2017   (JP) .............................. JP2017-136253

(51) Int. Cl.
*G01B 11/25*   (2006.01)
*G06T 7/521*   (2017.01)
*H04N 5/74*    (2006.01)

(52) U.S. Cl.
CPC .......... *G01B 11/2513* (2013.01); *G06T 7/521* (2017.01); *H04N 5/74* (2013.01)

(58) Field of Classification Search
CPC ................ G01B 11/25; G01B 11/2513; G01B 11/2536; G06T 7/521; G06T 7/529; (Continued)

(56) References Cited

U.S. PATENT DOCUMENTS

| 2004/0234260 A1 | 11/2004 | Arai et al. |
| 2013/0155191 A1 | 6/2013 | Ishigaki |

(Continued)

FOREIGN PATENT DOCUMENTS

| CN | 103162642 A | 6/2013 |
| JP | 2004-289613 | 10/2004 |

(Continued)

OTHER PUBLICATIONS

The Extended European Search Report dated Jun. 3, 2020 for the related European Patent Application No. 18832357.0.
(Continued)

*Primary Examiner* — Tri T Ton
(74) *Attorney, Agent, or Firm* — Greenblum & Bernstein, P.L.C.

(57) ABSTRACT

Projection device switches and projects a plurality of types of pattern images in a unit of projection frame. Imaging device images object to which the pattern image is projected and generates image data. Measurement device discriminates whether each imaging frame is a key frame of the image data obtained by capturing one of the pattern images or a blended frame of the image data obtained by capturing a plurality of the pattern images switched during an exposure period of one frame, and performs measurement based on a space coding method by using at least the image data of the key frame.

12 Claims, 16 Drawing Sheets

(58) Field of Classification Search
CPC ........ H04N 5/238; H04N 5/74; H04N 9/3185;
H04N 9/3194; A23L 33/105; A23V
2002/00; A23V 2200/324; A61K 36/34;
A61K 8/9789; A61K 9/0014; A61P
29/00; A61Q 19/00; A61Q 19/005
USPC ................................................ 356/600–640
See application file for complete search history.

(56) References Cited

U.S. PATENT DOCUMENTS

| | | |
|---|---|---|
| 2015/0204662 A1 | 7/2015 | Kobayashi et al. |
| 2018/0012372 A1 | 1/2018 | Takao et al. |
| 2019/0065004 A1 | 2/2019 | Niikura et al. |

FOREIGN PATENT DOCUMENTS

| | | |
|---|---|---|
| JP | 2014-032159 | 2/2014 |
| WO | 2015/134961 A1 | 9/2015 |
| WO | 2016/157601 A1 | 10/2016 |
| WO | 2017/060993 A1 | 4/2017 |

OTHER PUBLICATIONS

Xu Lu et al: "A facial recognition method based on 3-D images analysis for intuitive human-system interaction", 2013 International Joint Conference on Awareness Science and Technology & UBI-Media Computing (I CAST 2013 & UMEDIA 2013). IEEE, Nov. 2, 2013 (Nov. 2, 2013). pp. 371-377, XP032578629.
English Translation of Chinese Search Report dated Apr. 2, 2021 for the related Chinese Patent Application No. 201880046041.0.
International Search Report issued in International Patent Application No. PCT/JP2018/022140, dated Aug. 21, 2018.

Q11  Q13  Q15

Q12  Q16

Q14

PROJECTION IMAGING SYSTEM, MEASUREMENT DEVICE, AND PROJECTION IMAGING METHOD

TECHNICAL FIELD

The present invention relates to a projection imaging system, a measurement device, and a projection imaging method for performing three-dimensional measurement.

BACKGROUND ART

A technique for projecting a desired content image to an object such as a building, which is referred to as projection mapping, is known. Since the object has a three-dimensional shape, when the content image is projected as it is, the projected image is seen as a distorted image to an audience who is at a position separated from a position of the projection device because of unevenness on the surface of the object or magnitude of the depth. Therefore, a correspondence between pixels of each of an imaging device and the projection device in respective points of the object is measured in advance and performs coordinate transformation corresponding to the content image, such that the content image having no distortion can be seen.

A space coding method has been known as one method of measuring the correspondence between pixels of each of the imaging device and the projection device. The space coding method is a method of determining a coordinate correspondence between the imaging device and the projection device by decomposing coordinate information of a projection area of a projector into a bit plane, projecting a pattern image in which each bit is made into a binary image from the projection device to the object, imaging the object in which the pattern image is projected by the imaging device, and synthesizing binary information obtained by binarizing image data to a bit again.

In a projection imaging system using the space coding method, the imaging device cannot recognize a transfer time of the pattern image transferred from a personal computer (PC) to the projection device or a buffering time in the projection device. Thus, in order to accurately capture an image to which each pattern image is projected by the imaging device, a projection time of each pattern image needs to be sufficiently long.

PTLs 1 and 2 disclose the invention capable of accurately and rapidly obtaining an image to which each pattern image is projected to the object by synchronizing projection timing of each pattern image in the projection device and shutter timing in the imaging device.

CITATION LIST

Patent Literature

PTL 1: Japanese Patent Unexamined Publication No. 2004-289613
PTL 2: Japanese Patent Unexamined Publication No. 2014-32159

SUMMARY OF THE INVENTION

A commercially available projector (projection device) or a camera (imaging device) does not have a machine for mutually synchronizing and inputting/outputting a synchronization signal. Thus, the invention described in PTLs 1 and 2 cannot be realized by using the commercially available projector or the camera.

According to one aspect of the present disclosure, there are provided a projection imaging system, a measurement device, and a projection imaging method that are capable of accurately and rapidly obtaining an image to which each pattern image is projected to the object without synchronizing between the projection device and the imaging device.

According to one aspect of the present disclosure, there is provided a projection imaging system including: a projection device switching and projecting a plurality of types of pattern images in a unit of projection frame; an imaging device imaging an object to which the pattern image is projected and generating image data in a unit of imaging frame; and a measurement device discriminating whether each imaging frame is a key frame of the image data obtained by capturing one of the pattern images or a blended frame of the image data obtained by capturing two of the pattern images switched during an exposure period of one frame, and performing measurement based on a space coding method by using at least the image data of the key frame.

According to one aspect of the present disclosure, there is provided a measurement device including: an output unit outputting a projection pattern to a projection device which switches and projects a plurality of types of pattern images in a unit of projection frame; an input unit inputting image data from an imaging device which images an object to which the pattern image is projected and generates the image data in a unit of imaging frame; and a processor for discriminating whether each imaging frame is a key frame of the image data obtained by capturing one of the pattern images or a blended frame of the image data obtained by capturing two of the pattern images switched during an exposure period of one frame, and performing measurement based on a space coding method by using at least the image data of the key frame.

According to one aspect of the present disclosure, there is provided a projection imaging method including: switching and projecting a plurality of types of pattern images in a unit of projection frame; imaging an object to which the pattern image is projected; generating image data in a unit of imaging frame; discriminating whether each imaging frame is a key frame of the image data obtained by capturing one of the pattern images or a blended frame of the image data obtained by capturing two of the pattern images switched during an exposure period of one frame; and performing measurement based on a space coding method by using the image data of the key frame.

According to one aspect of the present disclosure, an image to which each pattern image is projected to the object can be accurately and rapidly obtained without synchronizing between the projection device and the imaging device. Therefore, according to one aspect of the present disclosure, the commercially available projector or the camera can be used.

DESCRIPTION OF EMBODIMENTS

Figure 1:
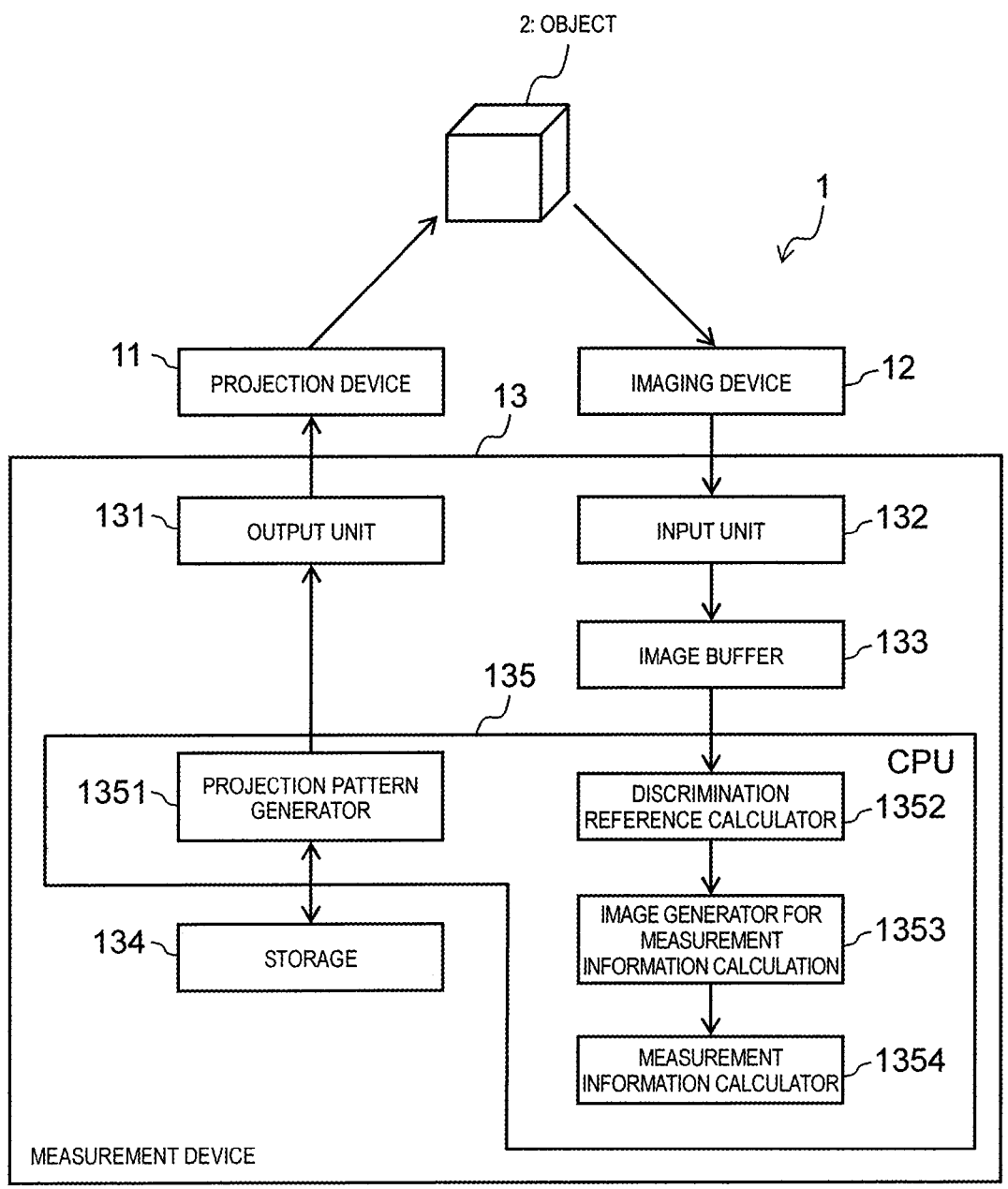
FIG. 1 is a diagram illustrating a configuration of a projection imaging system according to a first embodiment of the present invention.

Hereinafter, each embodiment of the present invention will be described in detail with reference to the drawings. The accompanying drawings and the following description are provided in order to allow those skilled in the art to fully understand the present disclosure, and it is not intended to limit the subject of the description to the scope of claims.

First Embodiment

<Configuration of Projection Imaging System>

A configuration of projection imaging system 1 according to a first embodiment of the present invention will be described below with reference to FIG. 1.

Projection imaging system 1 includes projection device 11, imaging device 12, and measurement device 13.

Projection device 11 is operated periodically and projects a plurality of types of pattern images of image data received from measurement device 13 to object 2 at a predetermined frame rate (a first frame rate) while sequentially switching the pattern images for each projection frame.

Imaging device 12 is operated periodically and images object 2 to which the pattern image is projected by projection device 11 at a predetermined frame rate (a second frame rate) without synchronizing with projection device 11 to generate image data. Imaging device 12 transmits the generated image data of each imaging frame (hereinafter, referred to as a "frame image") to measurement device 13.

Measurement device 13 discriminates whether the frame image received from imaging device 12 is image data of a key frame or image data of a blended frame and performs measurement based on a space coding method by using at least the image data of the key frame. The key frame is an imaging frame in a period of a single projection frame and an imaging frame of image data obtained by capturing a single pattern image. In addition, the blended frame is an imaging frame of image data obtained by capturing two pattern images switched during an exposure period of one frame.

<Configuration of Measurement Device>

A configuration of measurement device 13 according to the present embodiment will be described below with reference to FIG. 1.

Measurement device 13 includes output unit 131, input unit 132, image buffer 133, storage 134, and CPU 135.

Output unit 131 transmits image data of a pattern image generated by CPU 135 to projection device 11.

Input unit 132 outputs the image data received from imaging device 12 to image buffer 133.

Image buffer 133 temporarily stores the image data input from input unit 132.

Storage 134 stores pattern information on a predetermined image pattern in advance. Storage 134 stores a control program executed by CPU 135.

CPU 135 reads an image pattern from the pattern information stored in storage 134 and generates image data of the image pattern to output the generated image data to output unit 131. CPU 135 reads a frame image stored by image buffer 133, discriminates whether each frame image is image data of the key frame or the image data of the blended frame, and measures a correspondence between pixels of each of imaging device 12 and projection device 11 in respective points of the object using at least the image data of the key frame.

CPU 135 includes projection pattern generator 1351, discrimination reference calculator 1352, image generator for measurement information calculation 1353, and measurement information calculator 1354. Projection pattern generator 1351, discrimination reference calculator 1352, image generator for measurement information calculation 1353, and measurement information calculator 1354 are configured as a functional block when CPU 135 executes the control program.

Projection pattern generator 1351 generates a plurality of types of pattern images projected from projection device 11 to object 2 with reference to the image pattern stored in storage 134 and outputs the generated pattern images to output unit 131.

Discrimination reference calculator 1352 reads the image data stored in image buffer 133 and obtains a projection range and a reference value based on a pixel value (luminance) of the read image data. Discrimination reference calculator 1352 discriminates whether each imaging frame is a key frame or a blended frame based on the reference value of the image data within the projection range and outputs the discrimination result to image generator for measurement information calculation 1353.

Image generator for measurement information calculation 1353 generates a frame image used for the measurement based on a discrimination reference input from discrimination reference calculator 1352 and outputs the generated frame image to measurement information calculator 1354.

Measurement information calculator 1354 measures a correspondence between pixels of each of imaging device 12 and projection device 11 in respective points of object 2 by using the frame image input from image generator for measurement information calculation 1353.

<Projection Imaging Method>

Figure 2:
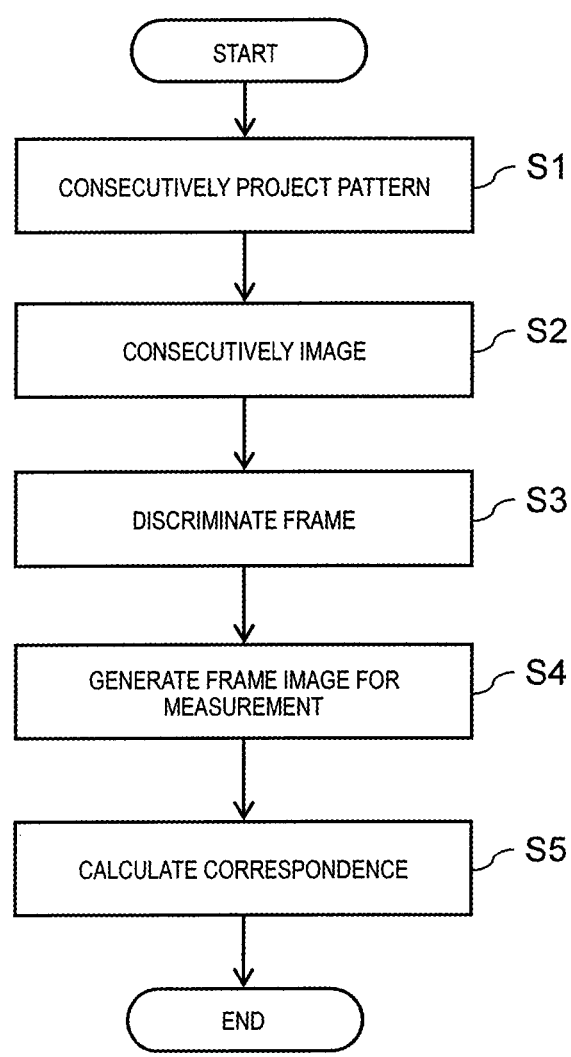
FIG. 2 is a flowchart illustrating a projection imaging method according to the first embodiment of the present invention.

A projection imaging method according to the present embodiment will be described below with reference to FIG. 2.

Figure 3:
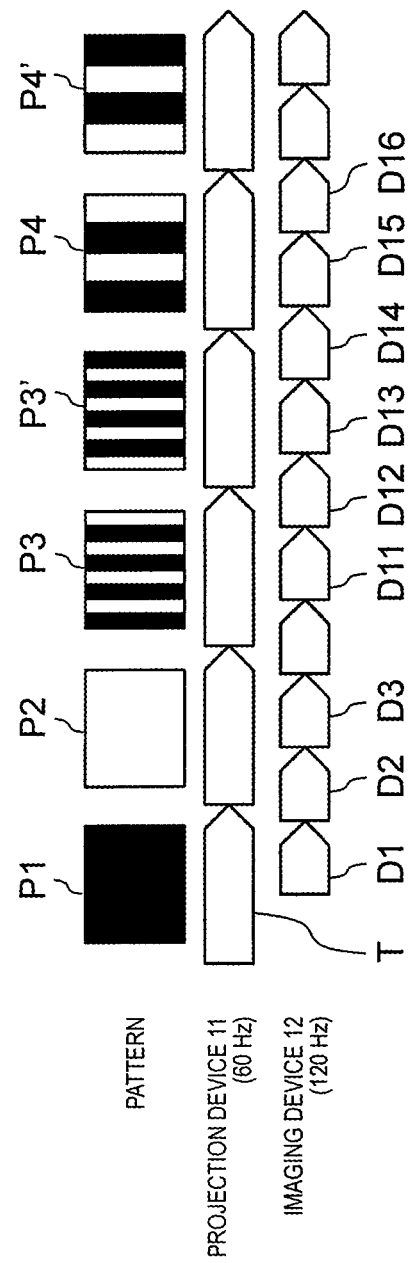
FIG. 3 is a diagram illustrating projection timing and imaging timing in the projection imaging method according to the first embodiment of the present invention.

First, projection device 11 consecutively projects predetermined pattern images while switching the pattern images for each projection frame (S1). Specifically, as illustrated in FIG. 3, projection device 11 sequentially switches pattern images P1, P2, P3, P3', P4, P4' for each projection frame T and consecutively projects pattern images P1, P2, P3, P3', P4, P4' to object 2. P1 is a pattern image whose entire surface is black, and P2 is a pattern image whose entire surface is white. In addition, each of P3 and P3' is a set of a pair of pattern images with a relationship in which white and black are reversed and each of P4 and P4' is a set of a pair of pattern images with a relationship in which white and black are reversed. The projection device 11 may not project any images instead of projection pattern image P1.

In addition, imaging device 12 consecutively images object 2 to which the pattern image is projected by projection device 11 and generates image data (S2). Imaging device 12 starts imaging so as to generate a first frame image while pattern image P1 is being projected at the latest.

Next, measurement device 13 discriminates whether or not each frame image generated by imaging device 12 is a key frame or a blended frame (S3). A discrimination method of the key frame and the blended frame according to the present embodiment will be described below.

Next, measurement device 13 generates a frame image for measurement by using the image data of the key frame (S4).

Next, measurement device 13 calculates a correspondence between pixels of each of imaging device 12 and projection device 11 in respective points of object 2 by using the frame image (S5).

<Discrimination Method of Key Frame/Blended Frame>

Next, a discrimination method of the key frame and the blended frame according to the present embodiment will be described below with reference to FIGS. 3 to 6C.

As illustrated in FIG. 3, first, measurement device 13 discriminates an imaging frame in a period when pattern image P1 is projected (hereinafter, referred to as a "black frame") and an imaging frame in a period when pattern image P2 is projected (hereinafter, referred to as a "white frame"). Since imaging device 12 starts imaging while pattern image P1 is projected at the latest, at least the first imaging frame is a black frame. After the second imaging frame, measurement device 13 sequentially compares an absolute difference sum between a pixel value (luminance) of the black frame and a pixel value of the imaging frame (hereinafter, referred to as a "pixel value difference") and threshold $Th_w$. Then, measurement device 13 determines the imaging frame in which the pixel value difference is threshold $Th_w$ or less as a black frame. In addition, measurement device 13 determines the first imaging frame in which the pixel value difference is greater than threshold $Th_w$ as the imaging frame in which pattern image P1 switched during the exposure period of one frame and pattern image P2 are captured (hereinafter, referred to as a "gray frame").

As an example of FIG. 3, a second frame rate of imaging device 12 (120 Hz) is twice a first frame rate of projection device 11 (60 Hz), and projection device 11 starts imaging after imaging device 12 starts the projection of pattern image P1. Therefore, only first imaging frame D1 is a black frame, and second imaging frame D2 is a gray frame. In addition, third imaging frame D3 is a white frame.

Next, measurement device 13 creates a projection range mask which masks a region other than an effective region (a region (pixel) used in calculation). Specifically, measurement device 13 calculates a pixel value difference between respective pixels of the black frame and the white frame and compares the pixel value difference and threshold $Th_m$. Then, measurement device 13 sets the pixel having a pixel value difference greater than threshold $Th_m$ as an effective region.

Next, for each imaging frame, measurement device 13 performs normalization of the pixel values of the image data in order to correct variation in the image data due to projection unevenness or a difference in a color or reflectivity to be projected. Specifically, measurement device 13 calculates a pixel value $f'_t$ for t-th imaging frame after the normalization in the effective region by the following Expression (1). In Expression (1), max represents the maximum value of the pixel value after the normalization and is "255" in general. In addition, min represents the minimum value of the pixel value after the normalization and is "0" in general. In addition, $f_t$ is a pixel value of the t-th imaging frame, $f_w$ is a pixel value of the white frame, and $f_b$ is a pixel value of the black frame.

$$f'_t = \frac{\max - \min}{|f_w - f_b|}(f_t - f_b) + \min \qquad (1)$$

Figure 4A:
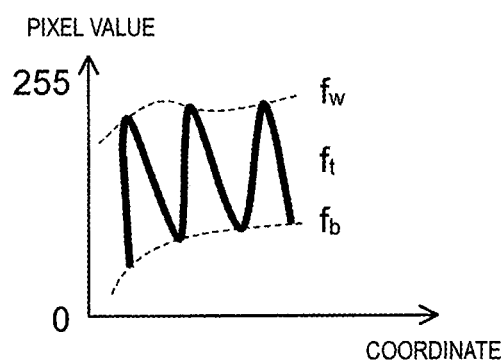
FIG. 4A is a graph illustrating an example of a change in a pixel value of an imaging frame in a horizontal direction in the projection imaging method according to the first embodiment of the present invention.
Figure 4B:
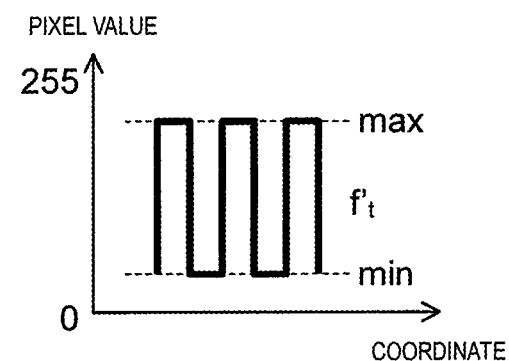
FIG. 4B is a graph illustrating an example of a change in a pixel value of an imaging frame in a horizontal direction in the projection imaging method according to the first embodiment of the present invention.

FIGS. 4A and 4B are graphs illustrating an example of a change in a pixel value of the imaging frame in the horizontal direction. Note that, FIG. 4A illustrates an example of the change before the normalization and FIG. 4B illustrates an example of the change after the normalization. As illustrated in FIG. 4B, the normalization is performed, such that a pixel value can be obtained in accordance with a color of the captured pattern image. As an example of FIG. 4B, the pixel value in a region obtained by imaging a black portion of the pattern image is close to min, and the pixel value in a region obtained by imaging a white portion of the pattern image is close to max.

Next, measurement device 13 discriminates whether each imaging frame is a key frame or a blended frame based on the pixel value after the normalization. Specifically, measurement device 13 calculates amplitude $A_t$ of the pixel value for t-th imaging frame by the following Expression (2) and compares amplitude $A_t$ of the pixel value with amplitude threshold $Th_a$. In Expression (2), N is the number of pixels in the effective region. Amplitude threshold $Th_a$ is calculated by the following Expression (3). In Expression (3), k is a coefficient and for example, "0.9".

$$A_t = \frac{1}{N}\sum \left| f'_t - \frac{\max + \min}{2} \right| \qquad (2)$$

$$Th_a = \frac{\max + \min}{2} \times k \qquad (3)$$

Then, measurement device 13 discriminates the imaging frame in which amplitude $A_t$ of the pixel value is greater than amplitude threshold $Th_a$ as a key frame. Meanwhile, measurement device 13 discriminates the imaging frame in which amplitude $A_t$ of the pixel value is amplitude threshold $Th_a$ or less as a blended frame.

Figure 5A:
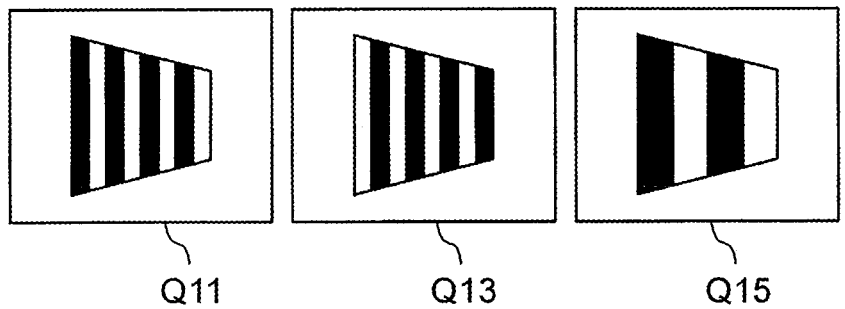
FIG. 5A is a diagram illustrating an image obtained by a measurement device in the projection imaging system according to the first embodiment of the present invention.
Figure 6A:
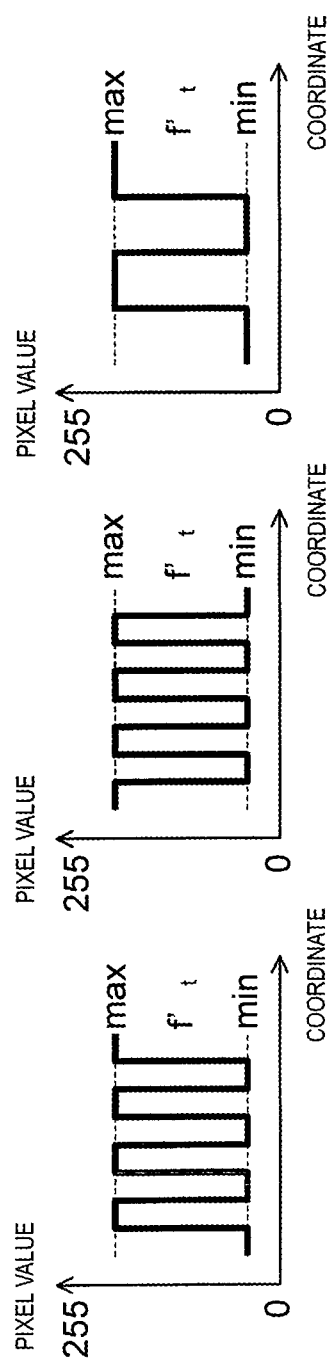
FIG. 6A are graphs illustrating a frame discrimination method in the projection imaging system according to the first embodiment of the present invention.

For example, image data Q11, Q13, and Q15 of imaging frames D11, D13, and D15 illustrated in FIG. 3 are two colors of white and black as illustrated in FIG. 5A, respectively. Theses pixel values after the normalization are illustrated in FIG. 6A, and amplitude $A_t$ of the pixel value (luminance) is greater than amplitude threshold $Th_a$. Accordingly, measurement device 13 determines imaging frames D11, D13, and D15 as a key frame.

Figure 5B:
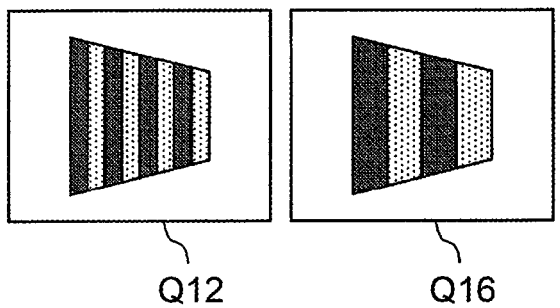
FIG. 5B is a diagram illustrating an image obtained by the measurement device in the projection imaging system according to the first embodiment of the present invention.
Figure 6B:
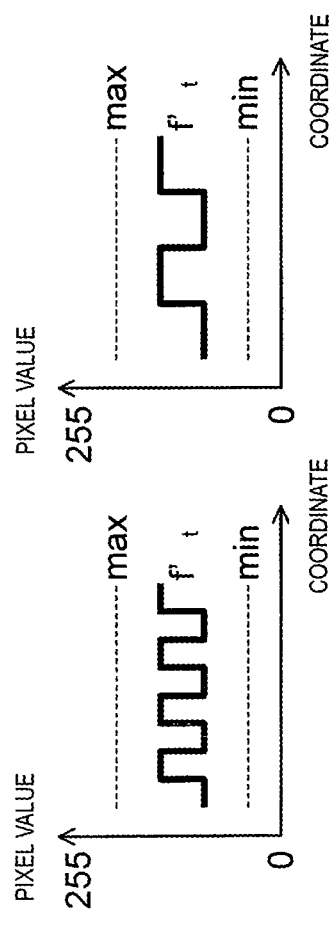
FIG. 6B are graphs illustrating the frame discrimination method in the projection imaging system according to the first embodiment of the present invention.

In addition, image data Q12 and Q16 of imaging frames D12 and D16 illustrated in FIG. 3 are two colors of dark gray and light gray as illustrated in FIG. 5B, respectively. These pixel values after the normalization are illustrated in FIG. 6B, and amplitude $A_t$ of the pixel value (luminance) is amplitude threshold $Th_a$ or less. Accordingly, measurement device 13 determines imaging frames D12 and D16 as a blended frame.

Figure 5C:
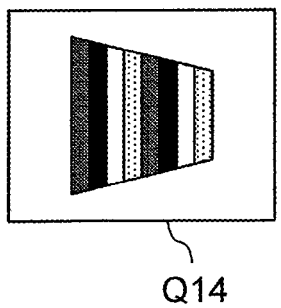
FIG. 5C is a diagram illustrating an image obtained by the measurement device in the projection imaging system according to the first embodiment of the present invention.
Figure 6C:
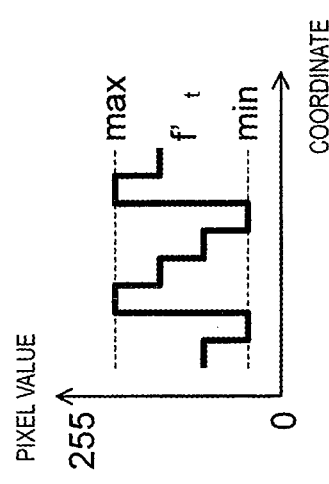
FIG. 6C is a graph illustrating the frame discrimination method in the projection imaging system according to the first embodiment of the present invention.

In addition, image data Q14 of imaging frame D14 illustrated in FIG. 3 is four colors of white, black, dark gray, and light gray as illustrated in FIG. 5C respectively. These pixel values after the normalization are illustrated in FIG. 6C, and amplitude $A_t$ of the pixel value (luminance) is amplitude threshold $Th_a$ or less. Accordingly, measurement device 13 determines imaging frames D14 as a blended frame.

<Effects>

As such, in the present embodiment, it is discriminated that whether each imaging frame is a key frame or a blended frame based on the amplitude of the pixel value in each frame image and at least the image data of the key frame is extracted. Accordingly, the image data required for measurement based on the space coding method can be rapidly obtained without synchronizing between the projection device and the imaging device.

In addition, according to the present embodiment, the key frame and the blended frame are discriminated by the normalization, such that the key frame and the blended frame can be accurately discriminated regardless of projection unevenness or a difference in a color or reflectivity to be projected.

Figure 7A:
FIG. 7A is a diagram illustrating a modification example of a projection image for obtaining a reference value in a projection imaging system according to the first embodiment of the present invention.
Figure 7B:
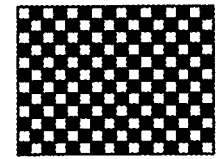
FIG. 7B is a diagram illustrating a modification example of a projection image for obtaining a reference value in the projection imaging system according to the first embodiment of the present invention.
Figure 7C:
FIG. 7C is a diagram illustrating a modification example of a projection image for obtaining a reference value in the projection imaging system according to the first embodiment of the present invention.

In the present embodiment, the effective region and thresholds $Th_w$, $Th_m$, and $Th_a$ are set by using pattern image P1 and pattern image P2, but these thresholds may be set by using a pair of pattern images obtained by reversing white and black of the image as illustrated in FIG. 7A, 7B, or 7C.

Second Embodiment

A configuration of the projection imaging system and a configuration of the measurement device according to a second embodiment of the present invention are the same as that in FIG. 1, and thus the description thereof will be omitted.

<Projection Imaging Method>

Figure 8:
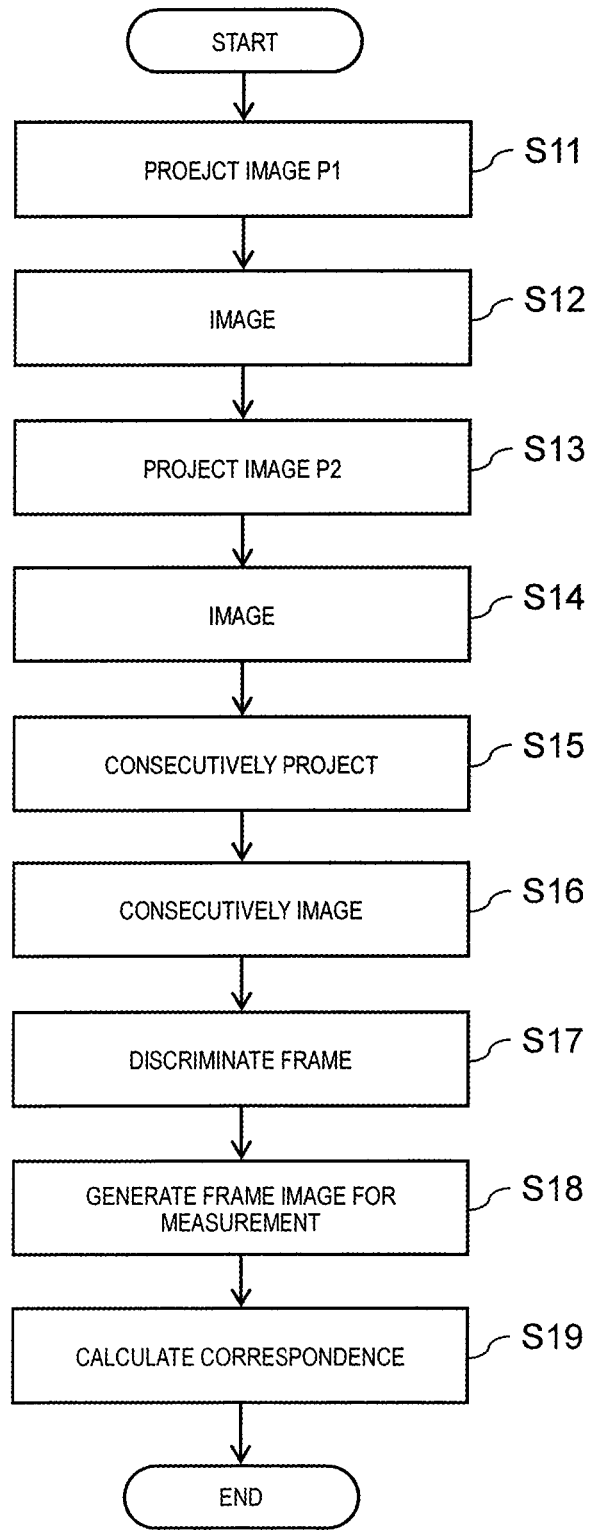
FIG. 8 is a flowchart illustrating a projection imaging method according to a second embodiment of the present invention.

A projection imaging method according to the present embodiment will be described below with reference to FIGS. 8 to 10.

First, projection device 11 projects pattern image P1 whose entire surface is black to object 2 based on the image data received from measurement device 13 (S11). Next, imaging device 12 images object 2 (S12).

Next, projection device 11 projects pattern image P2 whose entire surface is white to object 2 based on the image data received from measurement device 13 (S13). Next, imaging device 12 images object 2 (S14).

Measurement device 13 obtains a projection range and a reference value by using image data captured when pattern image P1 is projected to object 2 and image data captured when pattern image P2 is projected to object 2, which are received from imaging device 12.

Figure 9:
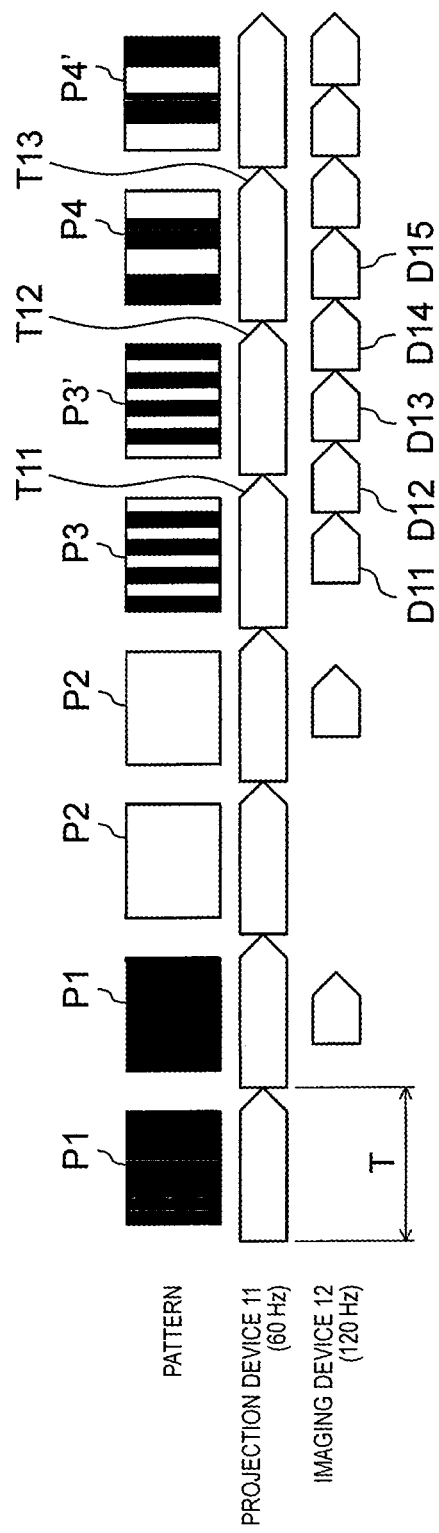
FIG. 9 is a diagram illustrating projection timing and imaging timing in the projection imaging method according to the second embodiment of the present invention.
Figure 10:
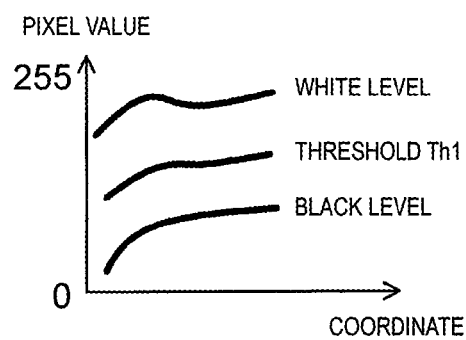
FIG. 10 is a graph illustrating a method of obtaining a reference value in the projection imaging method according to the second embodiment of the present invention.

Specifically, projection device 11 projects pattern image P1 and pattern image P2 to object 2 over a plurality of projection frames T (frame rate of 60 Hz) respectively, as illustrated in FIG. 9. As illustrated in FIG. 9, imaging device 12 images object 2 in a period when pattern image P1 is projected and a period when pattern image P2 is projected (frame rate of 120 Hz). As illustrated in FIG. 10, measurement device 13 obtains threshold Th1 as a projection range and a reference value based on a pixel value (black level) of the image data in which pattern image P1 is captured and a pixel value (white level) of the image data in which pattern image P2 is captured, which are received from imaging device 12.

Next, projection device 11 consecutively projects predetermined pattern images while switching the pattern images for each projection frame T (S15). Specifically, as illustrated in FIG. 9, projection device 11 sequentially switches pattern images P3, P3', P4, and P4' for each projection frame T and consecutively projects pattern images P3, P3', P4, and P4' to object 2. In addition, each of P3 and P3' is a set of a pair of pattern images with a relationship in which white and black are reversed and each of P4 and P4' is a set of a pair of pattern images with a relationship in which white and black are reversed.

Imaging device 12 consecutively images the object to which the pattern image is projected from projection device 11 (S16) and generates a frame image.

Next, measurement device 13 discriminates whether each frame image generated by imaging device 12 is a key frame or a blended frame (S17). A discrimination method of the key frame and the blended frame according to the present embodiment will be described below.

Next, measurement device 13 generates a frame image for measurement by using the image data of the key frame (S18).

Next, measurement device 13 calculates a correspondence between pixels of each of imaging device 12 and projection device 11 in respective points of object 2 by using the frame image (S19).

<Discrimination Method of Key Frame/Blended Frame>

Next, a discrimination method of the key frame and the blended frame according to the present embodiment will be described below with reference to FIG. 9.

Measurement device 13 selects three consecutive frame images obtained by imaging device 12. Here, the reason why the three consecutive frame images are selected is that there is a case in which projection switching timing and imaging timing may match, and in this case, it is necessary to compare the image data skipped by one sheet with each other.

For the two images of the selected three frame images, measurement device 13 measures the number of pixels in which white and black are reversed by comparing the pixel value of each pixel and threshold Th1, determines the other frame image having threshold Th2 (not illustrated) or greater as a key frame by the number of pixels reversed with respect to one frame image, and determines the other frame image having less than threshold Th2 as a blended frame by the number of pixels reversed with respect to one frame image.

For example, measurement device 13 selects image data of imaging frames D11, D12, and D13 illustrated in FIG. 9. Since imaging frame D12 straddles projection frames T11 and T12, the number of pixels reversed by the image data of the imaging frame D12 with respect to the image data of the imaging frame D11 is less than threshold Th2. In addition, since the number of pixels reversed by the image data of the imaging frame D13 with respect to the image data of the imaging frame D11 is all pixels, the number of pixels is threshold Th2 or greater. Further, the number of pixels reversed by the image data of the imaging frame D13 with respect to the image data of the imaging frame D12 is less than threshold Th2. Accordingly, measurement device 13 determines imaging frames D1l and D13 as a key frame and imaging frame D12 as a blended frame.

In addition, for example, measurement device 13 selects imaging frames D13, D14, and D15 illustrated in FIG. 9. Since imaging frame D14 straddles projection frames T12 and T13, the number of pixels reversed by the image data of the imaging frame D14 with respect to the image data of the imaging frame D13 is less than threshold Th2. In addition, since the number of pixels reversed by the image data of the imaging frame D15 with respect to the image data of the imaging frame D13 is half, the number of pixels is threshold Th2 or greater. Further, the number of pixels reversed by the image data of the imaging frame D15 with respect to the image data of the imaging frame D14 is less than threshold Th2. Accordingly, measurement device 13 determines imaging frames D13 and D15 as a key frame and imaging frame D14 as a blended frame.

<Effects>

As such, in the present embodiment, it is discriminated that whether each imaging frame is a key frame or a blended frame based on the number of pixels reversed by white and black in two of the three consecutive frame images and at least the image data of the key frame is extracted. Accordingly, image data required for measurement based on the space coding method can be rapidly obtained without synchronizing between the projection device and the imaging device.

In the present embodiment, the projection range and thresholds Th1 are set by using pattern image P1 and pattern image P2, but these threshold Th1 may be set by using a pair of images obtained by reversing white and black as illustrated in FIG. 7A, 7B, or 7C.

Third Embodiment

A configuration of the projection imaging system and a configuration of the measurement device according to a third embodiment of the present invention are the same as that in FIG. 1, and thus the description thereof will be omitted. In addition, a projection imaging method according to the present embodiment is the same as that in FIG. 2, and thus the description thereof will be omitted.

<Discrimination Method of Key Frame And Blended Frame>

A discrimination method of the key frame and the blended frame according to the present embodiment will be described below with reference to FIGS. 11 to 12C.

Measurement device 13 obtains a projection range and a reference value by using imaged data when pattern image P1 is projected to object 2 and imaged data when pattern image P2 is projected to object 2.

Figure 11:
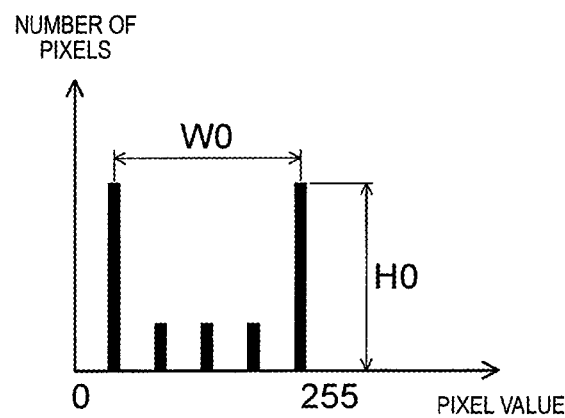
FIG. 11 is a graph illustrating a method of obtaining a reference value in the projection imaging system according to a third embodiment of the present invention.

Specifically, as illustrated in FIG. 11, measurement device 13 calculates a histogram based on a pixel value of a black frame and a pixel value of a white frame, obtains reference range W0 of the pixel value and the number of references H0 of the number of pixels in the histogram, and sets the reference range W0 and the number of references H0 as a reference value.

Next, measurement device 13 calculate the histogram of each imaging frame and obtains pixel value range W and the number of pixels H.

Figure 12A:
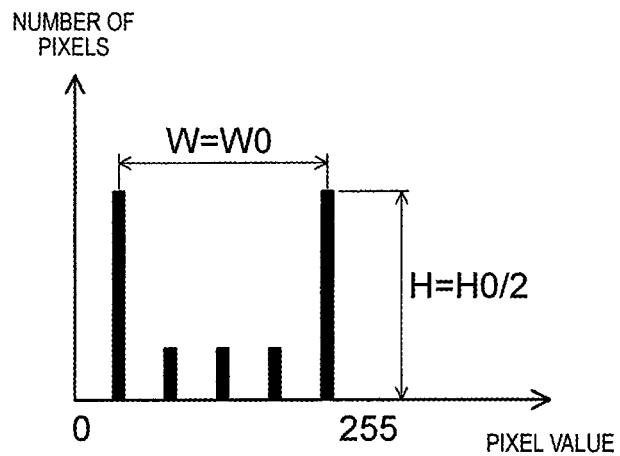
FIG. 12A is a graph illustrating a frame discrimination method in the projection imaging system according to the third embodiment of the present invention.

For example, as illustrated in FIG. 12A, measurement device 13 obtains that pixel value range W in the histogram of image data Q11, Q13, and Q15 illustrated in FIG. 5A of imaging frames D11, D13, and D15 illustrated in FIG. 3 is equal to reference range W0 (W=W0) and the number of pixels H is half of the number of references H0 (H=H0/2). Accordingly, measurement device 13 determines imaging frames D11, D13, and D15 as a key frame.

Figure 12B:
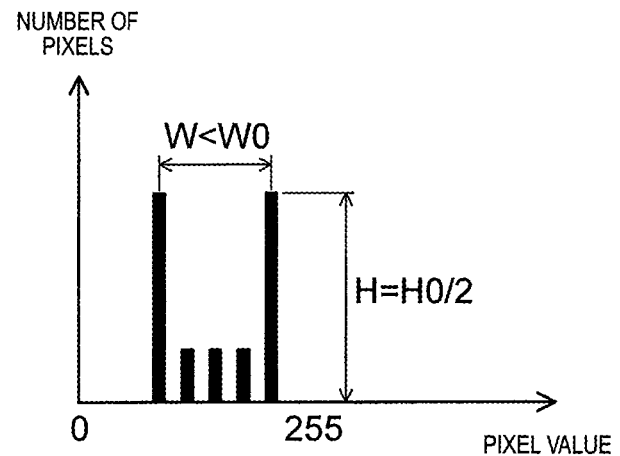
FIG. 12B is a graph illustrating the frame discrimination method in the projection imaging system according to the third embodiment of the present invention.

In addition, as illustrated in FIG. 12B, measurement device 13 obtains that pixel value range W in the histogram of image data Q12 and Q16 illustrated in FIG. 5B of imaging frames, D12 and D16 illustrated in FIG. 3 is smaller than reference range W0 (W<W0) and the number of pixels H is half of the number of references H0 (H=H0/2). In this case, measurement device 13 determines imaging frames D12 and D16 as blended frame A. Blended frame A is an imaging frame of image data obtained by capturing a pair of pattern images switched during an exposure period of one frame and obtained by reversing white and black.

Figure 12C:
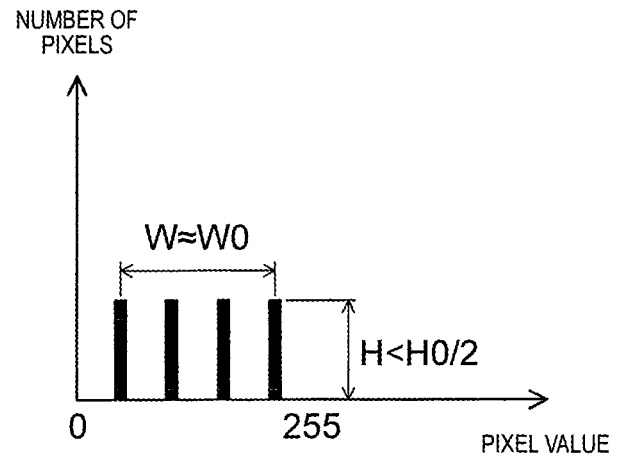
FIG. 12C is a graph illustrating the frame discrimination method in the projection imaging system according to the third embodiment of the present invention.

In addition, as illustrated in FIG. 12C, measurement device 13 obtains that pixel value range W in the histogram of image data Q14 illustrated in FIG. 5C of imaging frame D14 illustrated in FIG. 3 is substantially equal to reference range W0 (W≈W0) and the number of pixels H is smaller than half of the number of references H0 (H<H0/2). In this case, measurement device 13 determines imaging frames D14 as blended frame B. Blended frame B is a blended frame in addition to blended frame A and is an imaging frame of image data obtained by capturing two pattern images which are switched during an exposure period of one frame and are not a pair of pattern images obtained by reversing white and black.

<Effects>

As such, in the present embodiment, it is discriminated that whether each imaging frame is a key frame or a blended frame based on the pixel value range in each frame image and at least the image data of the key frame is extracted. Accordingly, image data required for measurement based on the space coding method can be rapidly obtained without synchronizing between the projection device and the imaging device.

In addition, according to the present embodiment, the key frame and the blended frame are discriminated by the normalization, such that the key frame and the blended frame can be accurately discriminated regardless of projection unevenness or a difference in a color or reflectivity to be projected.

Fourth Embodiment

In the first to third embodiments described above, a case of generating a frame image for measurement using only the image data of the key frame extracted by a discrimination process without using the image data of the blended frame, after the key frame and the blended frame are discriminated, has been described.

Whereas, in a fourth embodiment, a case of generating image data of a key frame using a blended frame after the key frame and the blended frame are discriminated, and generating a frame image for measurement using both of image data of the key frame extracted by a discrimination process and image data of the key frame generated from the blended frame, will be described.

A configuration of the projection imaging system and a configuration of the measurement device according to the present embodiment are the same as that in FIG. 1, and thus the description thereof will be omitted. In addition, a projection imaging method according to the present embodiment is the same as that in FIG. 2, and thus the description thereof will be omitted. In addition, in a process for discriminating the key frame and the blended frame, all of the processes describing in the first to third embodiments are used.

<Frame Image Generating Method>

A frame image generating method according to the present embodiment will be described below with reference to FIGS. 13A to 14D.

First, measurement device 13 generates image data of a key frame by using image data of a blended frame.

Figure 13A:
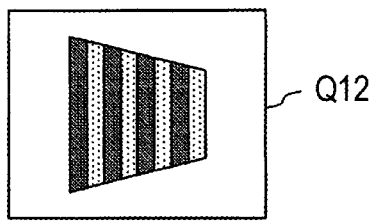
FIG. 13A is a diagram illustrating a method of generating image data of a key frame from image data of blended frame A in a projection imaging system according to a fourth embodiment of the present invention.
Figure 13B:
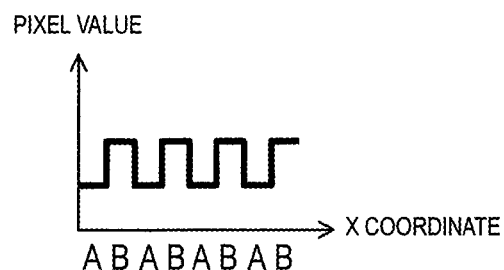
FIG. 13B is a graph illustrating the method of generating the image data of the key frame from the image data of blended frame A in the projection imaging system according to the fourth embodiment of the present invention.
Figure 13C:
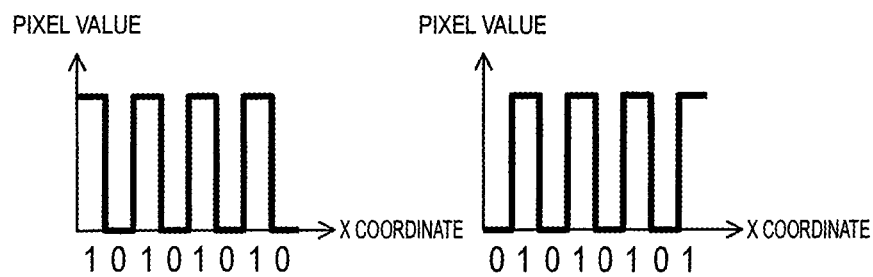
FIG. 13C are graphs illustrating the method of generating the image data of the key frame from the image data of blended frame A in the projection imaging system according to the fourth embodiment of the present invention.
Figure 13D:
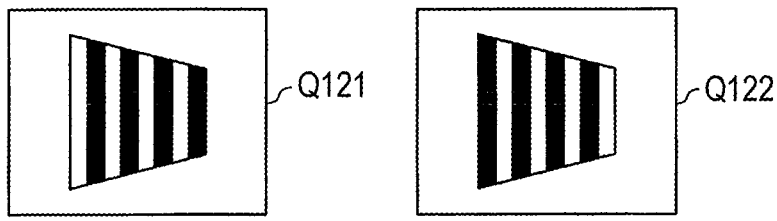
FIG. 13D are diagrams illustrating the method of generating the image data of the key frame from the image data of blended frame A in the projection imaging system according to the fourth embodiment of the present invention.

For example, as illustrated in FIG. 13B, measurement device 13 represents image data Q12 of blended frame D12 composed of two colors of dark gray and light gray illustrated in FIG. 13A by A and B according to a pixel value. Then, as illustrated in FIGS. 13C and 13D, measurement device 13 sets, as the image data of the key frame, image data Q121 generated by setting A to "1" and B to "0" and image data Q122 generated by reversing them to set A to "0" and B to "1".

Figure 14A:
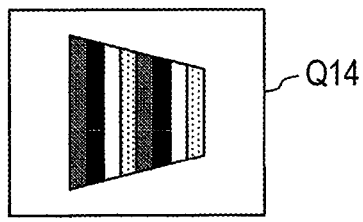
FIG. 14A is a diagram illustrating a method of generating image data of a key frame from image data of blended frame B in the projection imaging system according to the fourth embodiment of the present invention.
Figure 14B:
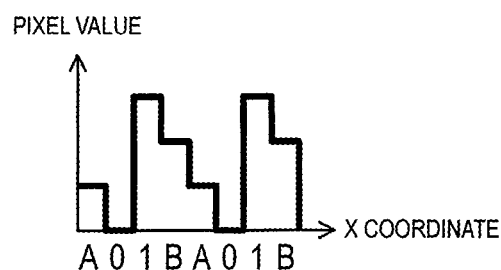
FIG. 14B is a graph illustrating the method of generating the image data of the key frame from the image data of blended frame B in the projection imaging system according to the fourth embodiment of the present invention.
Figure 14C:
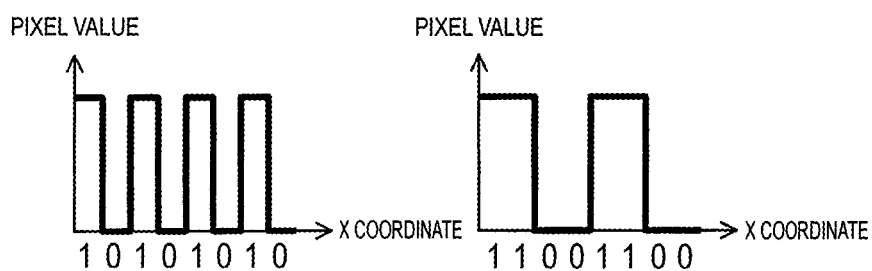
FIG. 14C are graphs illustrating the method of generating the image data of the key frame from the image data of blended frame B in the projection imaging system according to the fourth embodiment of the present invention.
Figure 14D:
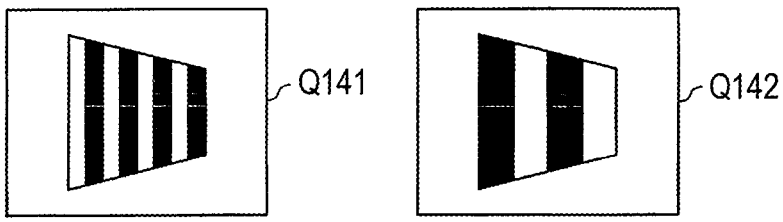
FIG. 14D are diagrams illustrating the method of generating the image data of the key frame from the image data of blended frame B in the projection imaging system according to the fourth embodiment of the present invention.

In addition, for example, measurement device 13 represents image data Q14 of blended frame D14 composed of four colors of white, black, dark gray, and light gray illustrated in FIG. 14A, in which white is represented by "1", black is represented by "0", dark gray is represented by "A", and light gray is represented by "B", as illustrated in FIG. 14B. Then, as illustrated in FIGS. 14C and 14D, measurement device 13 sets, as the image data of the key frame, image data Q141 generated by setting A to "1" and B to "0" and image data Q142 generated by reversing them to set A to "0" and B to "1".

Since gray is set as a single color when blended ratios of the image data of blended frame A and the image data of blended frame B are each 50%, the image data of the key frame is skipped without generating.

Measurement device 13 adds the image data of the key frame generated by the above method to the respective preceding and subsequent image data of the key frame.

Then, measurement device 13 generates a frame image by using the image data of the key frame.

<Effects>

As such, according to the present embodiment, the image data of the blended frame is processed to generate the image data of the key frame. Therefore, pseudo image data of the key frame can be obtained by adding the discriminated image data of the key frame and the generated image data of the key frame having a long exposure time, and thus image data of the key frame having reduced noise can be obtained.

In the present embodiment, reference range W0 and the number of references H0 are obtained by using pattern image P1 and pattern image P2. However, as in the first embodiment, reference range W0 and the number of references H0 may be obtained by using a pair of images obtained by reversing white and black as illustrated in FIG. 7A, 7B, or 7C.

Fifth Embodiment

In a fifth embodiment of the present invention, a case in which no key frame is obtained by imaging will be described. A configuration of the projection imaging system and a configuration of the measurement device according to the present embodiment are the same as that in FIG. 1, and thus the description thereof will be omitted.

\<Projection Imaging Method\>

Figure 15:
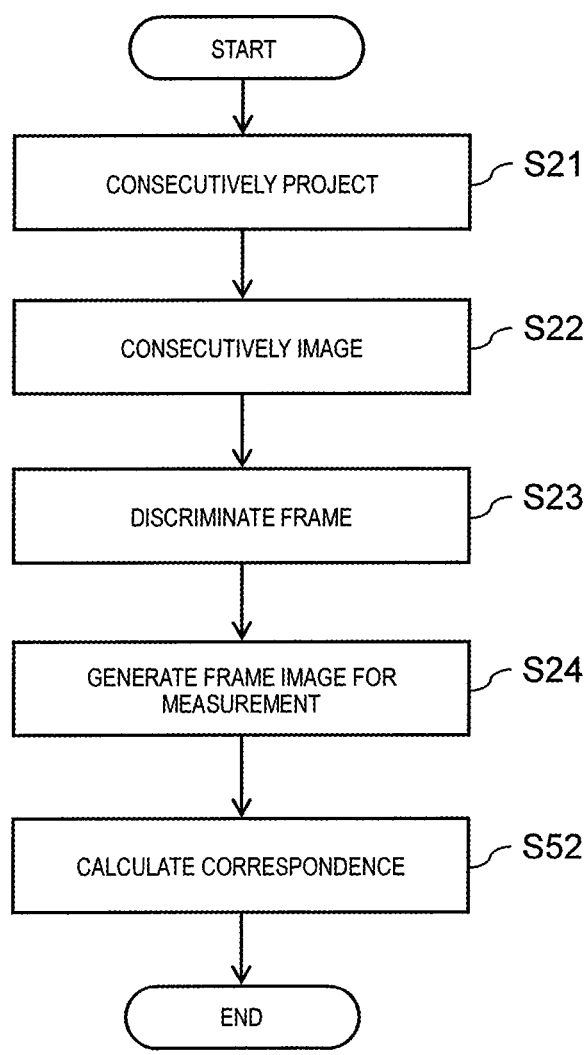
FIG. 15 is a flowchart illustrating a projection imaging method according to a fifth embodiment of the present invention.

A projection imaging method according to the present embodiment will be described below with reference to FIGS. 15 and 16.

Figure 16:
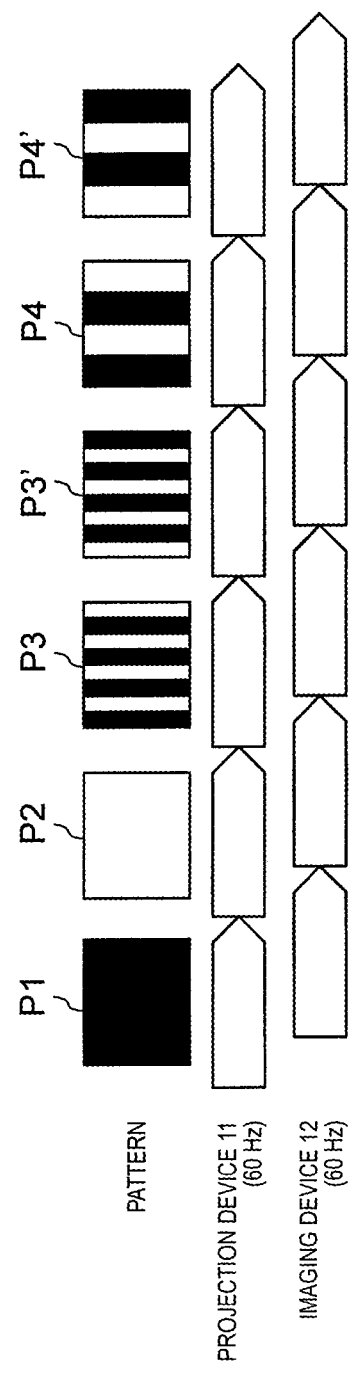
FIG. 16 is a diagram illustrating timing of consecutive projecting and imaging in the projection imaging system according to the fifth embodiment of the present invention.

In the present embodiment, as illustrated in FIG. 16, projection device 11 projects each pattern image to object 2 at a frame rate of 60 Hz, and imaging device 12 images object 2 at a frame rate of 60 Hz which is the same as that of projection device 11.

First, projection device 11 consecutively projects a predetermined pattern image (S21).

Specifically, as illustrated in FIG. 16, projection device 11 sequentially switches pattern images P3, P3', P4, and P4' for each projection frame T and consecutively projects pattern images P3, P3', P4, and P4' to object 2. In addition, each of P3 and P3' is a set of a pair of pattern images with a relationship in which white and black are reversed and each of P4 and P4' is a set of a pair of pattern images with a relationship in which white and black are reversed.

Next, imaging device 12 performs consecutive imaging (S22).

Next, measurement device 13 performs the normalization described in the first embodiment or the third embodiment on each frame image data generated by imaging device 12 and discriminates whether each frame image generated by imaging device 12 is blended frame A or blended frame B (S23). Then, image data of the key frame is generated from the image data of the blended frame by the same method as the fourth embodiment. In this case, measurement device 13 adds the generated image data of a plurality of key frames as it is, or weighs and adds the generated image data of the respective plurality of key frames.

Next, measurement device 13 generates a frame image for measurement by using the generated image data of the key frame (S24).

Next, measurement device 13 calculates a correspondence between pixels of each of imaging device 12 and projection device 11 in respective points of object 2 by using the frame image (S25).

As such, according to the present embodiment, even in a case where no image data of the key frame is obtained, the image data of the key frame can be obtained by using the image data of the blended frame.

In the present embodiment, the projection range may be determined by using the captured image data when pattern image P1 and pattern image P2 are projected to the object.

In addition, in the present embodiment, the generated image data of the key frame may be or may not be added.

Other Embodiments

Figure 17:
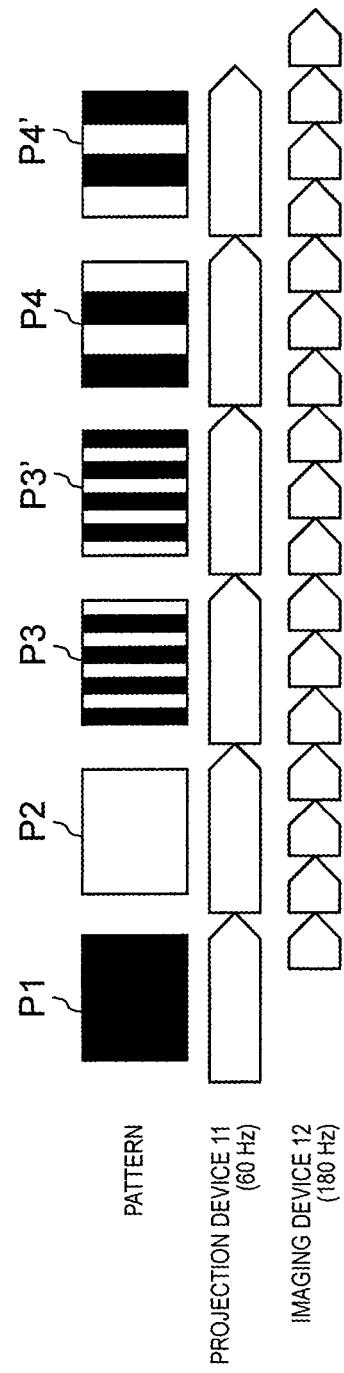
FIG. 17 is a diagram illustrating projection timing and imaging timing in the projection imaging system according to other embodiments of the present invention.

In a case where a frame rate of imaging device 12 is twice or more a frame rate of projection device 11, measurement device 13 can obtain the image data of the plurality of key frames to each projection frame, and thus the obtained image data of the plurality of the key frames may be added for each projection frame. For example, as illustrated in FIG. 17, when projection device 11 projects an image at a frame rate of 60 Hz and imaging device 12 captures an image at a frame rate of 180 Hz, measurement device 13 adds the image data of two key frames obtained for each projection frame.

In addition, measurement device 13 may project one image for each pattern without projecting a pair of images obtained by reversing white and black. In this case, only the image data of blended frame B can be obtained.

The present invention is not limited to the above embodiments in terms of the types, dispositions, numbers, and the like of members and can be appropriately modified to the extent not departing from the gist of the invention, such as appropriately replacing the constituents of the embodiments by those achieving the same effect.

INDUSTRIAL APPLICABILITY

The present invention is suitable for the projection imaging system and the projection imaging method.

REFERENCE MARKS IN THE DRAWINGS

1 PROJECTION IMAGING SYSTEM
2 OBJECT
11 PROJECTION DEVICE
12 IMAGING DEVICE
13 MEASUREMENT DEVICE
131 OUTPUT UNIT
132 INPUT UNIT
133 IMAGE BUFFER
134 STORAGE
135 CPU
1351 PROJECTION PATTERN GENERATOR
1352 DISCRIMINATION REFERENCE CALCULATOR
1353 IMAGE GENERATOR FOR MEASUREMENT INFORMATION CALCULATION
1354 MEASUREMENT INFORMATION CALCULATOR

The invention claimed is:

1. A projection imaging system, comprising:
a projector switching and projecting a plurality of types of pattern images in a unit of projection frame;
a camera imaging an object to which the pattern image is projected and generating image data in a unit of imaging frame; and
a processor, when executing instructions stored in a non-transitory memory, that performs operations including:
discriminating whether each imaging frame is a key frame of the image data obtained by capturing one of the pattern images or a blended frame of the image data obtained by capturing two of the pattern images switched during an exposure period of one frame, and
performing measurement based on a space coding method by using at least the image data of the key frame.

2. The projection imaging system of claim 1,
wherein the processor determines whether the imaging frame is the key frame or the blended frame based on a magnitude relationship between an amplitude of a pixel value and an amplitude threshold in the image data of each imaging frame.

3. The projection imaging system of claim 1,
wherein the processor measures the number of pixels in which white and black are reversed by comparing a pixel value of each pixel and a first threshold for two image data out of the image data of three consecutive imaging frames, and
determines whether the imaging frame is the key frame or the blended frame based on a magnitude relationship between the number of reversed pixels and a second threshold.

4. The projection imaging system of claim 1,
wherein the processor determines whether the imaging frame is the key frame or the blended frame based on a relationship between a pixel value range and a reference range in a histogram of the image data of each imaging frame and a magnitude relationship between the number of pixels of a maximum pixel value and the number of references.

5. A projection imaging system, comprising:
a projector switching and projecting a plurality of types of pattern images in a unit of projection frame;
a camera imaging an object to which the pattern image is projected and generating image data in a unit of imaging frame; and
a processor, when executing instructions stored in a non-transitory memory, that performs operations including:
generating a key frame of image data obtained by capturing one of the pattern images from a blended frame of image data obtained by capturing two of the pattern images switched during an exposure period of one frame, and
performing measurement based on a space coding method by using the image data of the key frame.

6. The projection imaging system of claim 5,
wherein the processor discriminates whether the blended frame is a first blended frame of the image data obtained by capturing a pair of pattern images obtained by reversing white and black or a second blended frame other than the first blended frame, and generates image data of the key frame by processes different between the first blended frame and the second blended frame.

7. The projection imaging system of claim 6,
wherein in the image data of the first blended frame composed of two colors of dark gray and light gray, the processor converts one of a pixel value of the dark gray and a pixel value of the light gray into a white pixel value and the other pixel value into a black pixel value, thereby generating the image data of the key frame.

8. The projection imaging system of claim 6,
wherein in the image data of the second blended frame composed of four colors of white, black, dark gray, and light gray, the processor converts one of a pixel value of the dark gray and a pixel value of the light gray into a white pixel value and the other pixel value into a black pixel value, thereby generating the image data of the key frame.

9. A measurement device, comprising:
a processor, when executing instructions stored in a non-transitory memory, that performs operations including:
outputting a projection pattern to a projector which switches and projects a plurality of types of pattern images in a unit of projection frame;
inputting image data from a camera which images an object to which the pattern image is projected and generates the image data in a unit of imaging frame;
discriminating whether each imaging frame is a key frame of the image data obtained by capturing one of the pattern images or a blended frame of the image data obtained by capturing two of the pattern images switched during an exposure period of one frame; and
performing measurement based on a space coding method by using at least the image data of the key frame.

10. A measurement device, comprising:
a processor, when executing instructions stored in a non-transitory memory, that performs operations including:
outputting a projection pattern to a projector which switches and projects a plurality of types of pattern images in a unit of projection frame;
inputting image data from a camera which images an object to which the pattern image is projected and generates the image data in a unit of imaging frame;
generating a key frame of image data obtained by capturing one of the pattern images from a blended frame of image data obtained by capturing two of the pattern images switched during an exposure period of one frame; and
performing measurement based on a space coding method by using the image data of the key frame.

11. A projection imaging method, comprising:
switching and projecting a plurality of types of pattern images in a unit of projection frame;
imaging an object to which the pattern image is projected;
generating image data in a unit of imaging frame;
discriminating whether each imaging frame is a key frame of the image data obtained by capturing one of the pattern images or a blended frame of the image data obtained by capturing two of the pattern images switched during an exposure period of one frame; and
performing measurement based on a space coding method by using at least the image data of the key frame.

12. A projection imaging method, comprising:
switching and projecting a plurality of types of pattern images in a unit of projection frame;
imaging an object to which the pattern image is projected;
generating image data in a unit of imaging frame;
generating a key frame of image data obtained by capturing one of the pattern images from a blended frame of image data obtained by capturing two of the pattern images switched during an exposure period of one frame; and
performing measurement based on a space coding method by using the image data of the key frame.

* * * * *